C. H. WILLIAMS, Jr.
BRAKE BEAM THIRD POINT SUSPENSION MOUNT.
APPLICATION FILED MAY 23, 1913.

1,080,741. Patented Dec. 9, 1913.

Witnesses,
J. Adolph Bishop
M. R. Smith

Inventor
Charles H. Williams Jr.,
Atty.

UNITED STATES PATENT OFFICE.

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM THIRD-POINT-SUSPENSION MOUNT.

1,080,741.   Specification of Letters Patent.   Patented Dec. 9, 1913.

Application filed May 23, 1913. Serial No. 769,458.

*To all whom it may concern:*

Be it known that I, CHARLES H. WILLIAMS, Jr., a citizen of the United States, residing at the city of Chicago, State of Illinois, have invented a certain new and useful Improvement in Brake-Beam Third-Point-Suspension Mounts, of which the following is a full, clear, and exact description, such as will enable others skilled in the art to which it appertains to make and use the same, reference being had to the accompanying drawings, forming part of this specification, in which—

Figure 1:
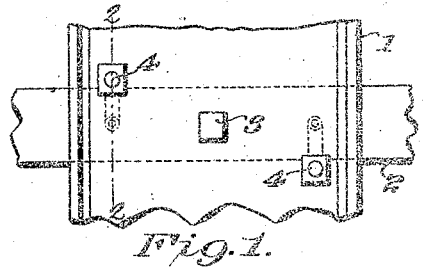
Figure 2:
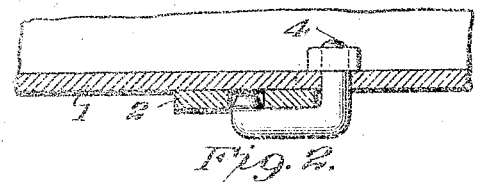
Figure 3:
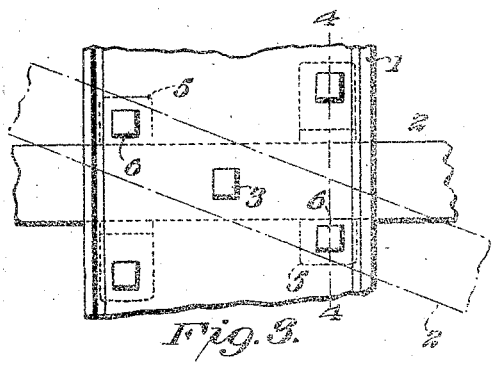
Figure 4:
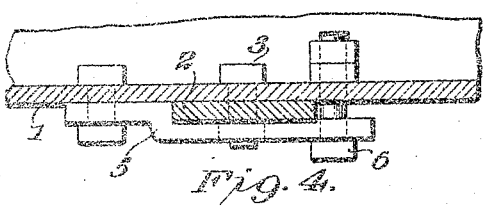
Figure 5:
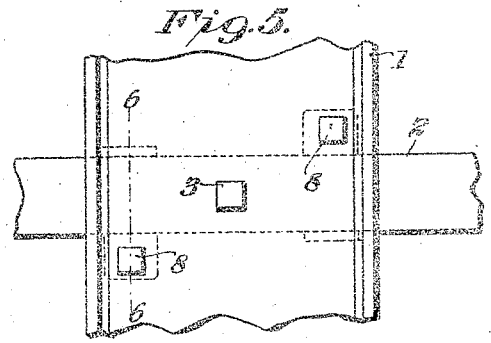
Figure 6:
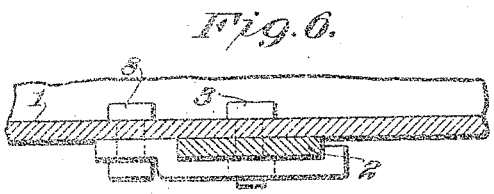
Figure 7:
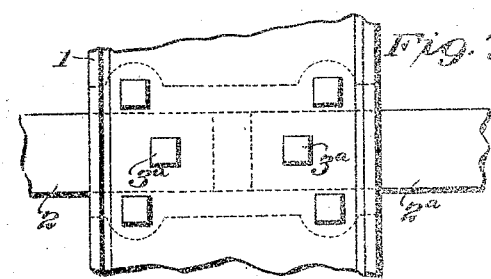
Figure 8:
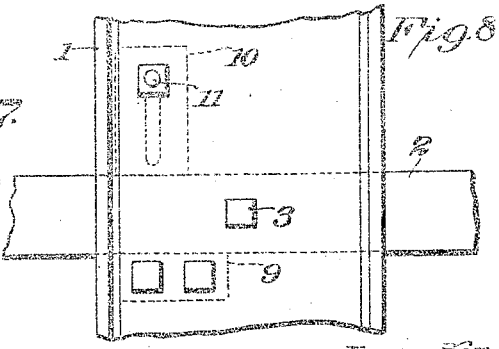

Figure 1 is a plan view of one form of my improved brake beam third point suspension. Fig. 2 is an enlarged vertical sectional view on line 2—2 of Fig. 1. Fig. 3 is a plan view of another modified form of suspension spring mounting. Fig. 4 is a vertical sectional view on line 4—4 of Fig. 3. Fig. 5 is a plan view of another form of suspension spring mounting. Fig. 6 is a vertical sectional view on line 6—6 of Fig. 5. Figs. 7 and 8 are plan views of other modified forms of suspension spring mountings.

This invention relates to a new and useful improvement in brake beam third point suspension spring mountings, its object being to enable the suspension spring to be swung out of the way of the brake beam in the event that it is desired to unhang said beam.

In Patent No. 997,888 granted to me July 11, 1911, is shown an arrangement of third point suspension spring wherein the same is fixedly mounted to the spring plank of the truck. Being located under the brake beam, it is necessary in the patent referred to, especially where the beams are hung from trucks having narrow wheel bases, to manipulate the beam and twist it around in close quarters where it is desired to unhang and remove the beam or to rehang a new beam. The third point suspension spring being located directly under the beam is in the way and sometimes it is desirable to either remove this third point suspension spring to permit the unhanging of the beam and the rehanging of the new beam, or to swing said third point suspension spring to one side to enable the removal and replacement of the beam.

My present invention contemplates means for enabling the third point suspension spring to be swung out of the way or to be removed entirely to permit the unhanging and rehanging of beams in the truck.

In the drawings 1 indicates the spring plank of an ordinary car truck shown as being in the form of a channel and 2 indicates the third point suspension spring for the brake beam.

3 indicates a pivot bolt shown in Figs. 1 to 6 inclusive which forms an axis around which the third point suspension spring may be swung in order to enable the unhanging or rehanging of the beam.

Means are provided for holding the third point suspension spring in operative position and these, as shown in Figs. 1 and 2, comprise two hook bolts 4, secured to the spring plank 1 and arranged on opposite sides of the pivot bolt 3. The hooked end of these bolts fit in recesses in the third point suspension spring and when tightened up securely hold said spring in place. When loosened these hook bolts permit the suspension spring to be swung on the pivot bolt 3 for purposes above indicated.

In Figs. 3 and 4, I have shown another form in which oppositely disposed clamping plates 5 are employed, the ends of these plates which are spaced from the spring plank 2 being secured in position by bolts 6. When these bolts are removed the third point suspension spring can be swung on its pivot bolt as indicated in dotted lines, Fig. 3.

In Figs. 5 and 6, I have shown another modification in which the clamping plates 7 are provided with lips designed to hold the third point suspension spring in place. When it is desired to swing the spring on pivot bolt the bolts 8 may be loosened.

In Fig. 7, I have shown another modification in which the third point suspension spring is divided into two sections, 2 and 2ª, each of which sections is secured in position by the bolt 3ª, the ends being held under the spring plank by means of a U-shaped clamping plate. Upon the removal of the bolts 3ª the desired spring section may be removed.

In Fig. 8, I have shown another modification in which there is a clamping plate 9 similar to the clamping plate shown in Fig. 4, and a slotted plate 10 which, when its holding bolt 11 is loosened, permits said slotted plate to be withdrawn and the third point suspension spring swung on its pivot bolt 3.

What I claim is:

1. The combination with a part of a car truck, of a third point suspension spring mounted thereon, and means for holding said spring in position, said means permitting the third point suspension spring to be moved whereby the brake beam may be unhung or hung.

2. The combination with a part of a car truck, of a third point suspension spring mounted thereon, and means for holding said spring in position, said means permitting the third point suspension spring to be moved laterally whereby the brake beam may be unhung or hung.

3. The combination with a part of a car truck, of a third point brake beam support pivotally mounted thereon, and means for holding said support in operative position.

4. The combination with a part of a car truck, of a third point brake beam support pivotally mounted thereon, and means coöperating therewith on each side of said pivotal point for holding said support in operative position, said means permitting said support to be swung on its pivot out of the way of the brake beam.

In testimony whereof I hereunto affix my signature in the presence of two witnesses, this 14th day of May, 1913.

CHARLES H. WILLIAMS, Jr.

Witnesses:
E. T. Walker,
M. F. Huntoon.